(12) United States Patent
Yasuda et al.

(10) Patent No.: US 9,547,475 B2
(45) Date of Patent: Jan. 17, 2017

(54) RANDOM NUMBER GENERATING CIRCUIT

(71) Applicant: KABUSHIKI KAISHA TOSHIBA, Tokyo (JP)

(72) Inventors: Shinichi Yasuda, Tokyo (JP); Tetsufumi Tanamoto, Kawasaki (JP); Noriko Inoue, Tokyo (JP); Akira Tomita, Yokohama (JP); Ryusuke Murakami, Tokyo (JP); Atsushi Shimbo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 300 days.

(21) Appl. No.: 14/086,389

(22) Filed: Nov. 21, 2013

(65) Prior Publication Data
US 2014/0143292 A1 May 22, 2014

(30) Foreign Application Priority Data
Nov. 21, 2012 (JP) ................................. 2012-255734

(51) Int. Cl.
*G06F 7/58* (2006.01)
(52) U.S. Cl.
CPC .................. *G06F 7/588* (2013.01); *G06F 7/58* (2013.01); *G06F 7/582* (2013.01); *G06F 7/584* (2013.01)
(58) Field of Classification Search
CPC .................................. G06F 7/588; G06F 7/584
USPC ........................................................ 708/251
See application file for complete search history.

(56) References Cited

U.S. PATENT DOCUMENTS

| 6,242,953 B1 * | 6/2001 | Thomas ................... G06F 1/08 327/115 |
| 6,968,460 B1 * | 11/2005 | Gulick ...................... G06F 7/58 708/250 |
| 8,583,711 B2 * | 11/2013 | Hars ...................... G06F 7/588 331/57 |
| 2004/0039762 A1 | 2/2004 | Hars |

(Continued)

FOREIGN PATENT DOCUMENTS

| JP | 6-314188 | 11/1994 |
| JP | 2004-234153 | 8/2004 |

(Continued)

OTHER PUBLICATIONS

Notification of Reasons for Refusal issued by the Japanese Patent Office on Aug. 16, 2016, in counterpart Japanese Patent Application No. 2012-255734.

*Primary Examiner* — Andrew Caldwell
*Assistant Examiner* — Calvin M Brien
(74) *Attorney, Agent, or Firm* — Finnegan, Henderson, Farabow, Garrett & Dunner LLP

(57) ABSTRACT

According to one embodiment, a random number generating circuit includes first to N-th oscillating circuits (N is a natural number equal to 2 or greater), first to N-th latch circuits that latch outputs of the first to N-th oscillating circuits by a first clock having a first frequency, first to N-th exclusive OR circuits, (N+1)-th to (2×N)-th latch circuits that latch outputs of the first to N-th exclusive OR circuits by the first clock, an (N+1)-th exclusive OR circuit that outputs an exclusive OR of outputs of the (N+1)-th to (2×N)-th latch circuits, and an M-bit shift register that converts serial data output from the (N+1)-th exclusive OR circuit into M-bit parallel data (M is a natural number equal to 2 or greater) by a second clock having a second frequency.

17 Claims, 15 Drawing Sheets

(56) References Cited

U.S. PATENT DOCUMENTS

| | | | | |
|---|---|---|---|---|
| 2005/0071399 A1* | 3/2005 | Bonaccio | ......... | G01R 31/31703 |
| | | | | 708/250 |
| 2007/0143384 A1* | 6/2007 | Muranaka | ............... | G06F 7/588 |
| | | | | 708/250 |
| 2009/0222502 A1 | 9/2009 | Ikegami et al. | | |
| 2011/0302232 A1* | 12/2011 | Vasyltsov | ............... | G06F 7/588 |
| | | | | 708/251 |
| 2012/0221616 A1* | 8/2012 | Yasuda | .................... | H03K 3/84 |
| | | | | 708/251 |

FOREIGN PATENT DOCUMENTS

| | | | | |
|---|---|---|---|---|
| JP | 2005-536796 | 12/2005 | | |
| JP | 2009-53906 | 3/2009 | | |
| JP | 2012-048614 | 3/2012 | | |
| JP | 2012-129784 | 7/2012 | | |
| MY | WO 2010047575 A2 * | 4/2010 | ............... | G06F 7/58 |

* cited by examiner

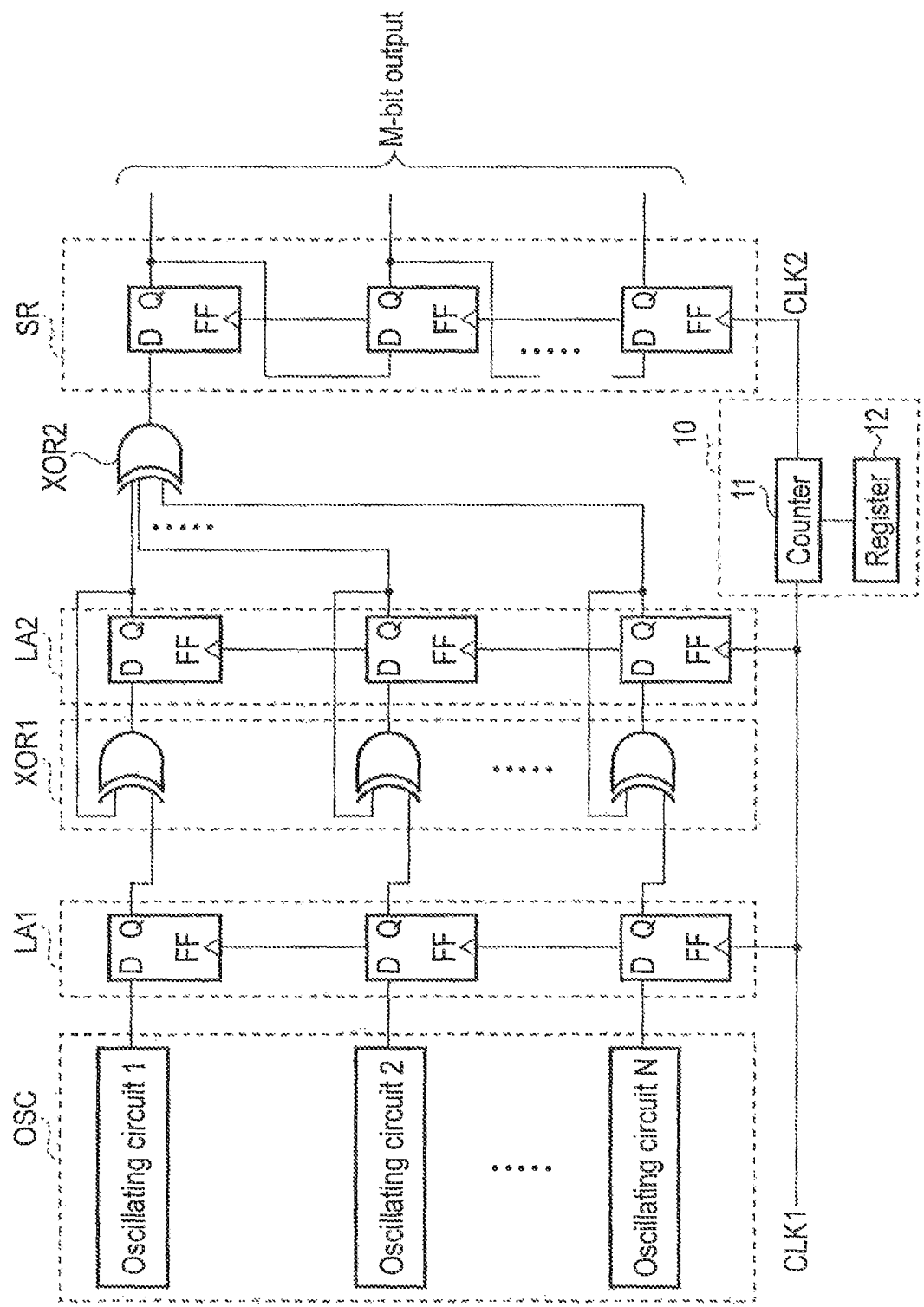
F I G. 4

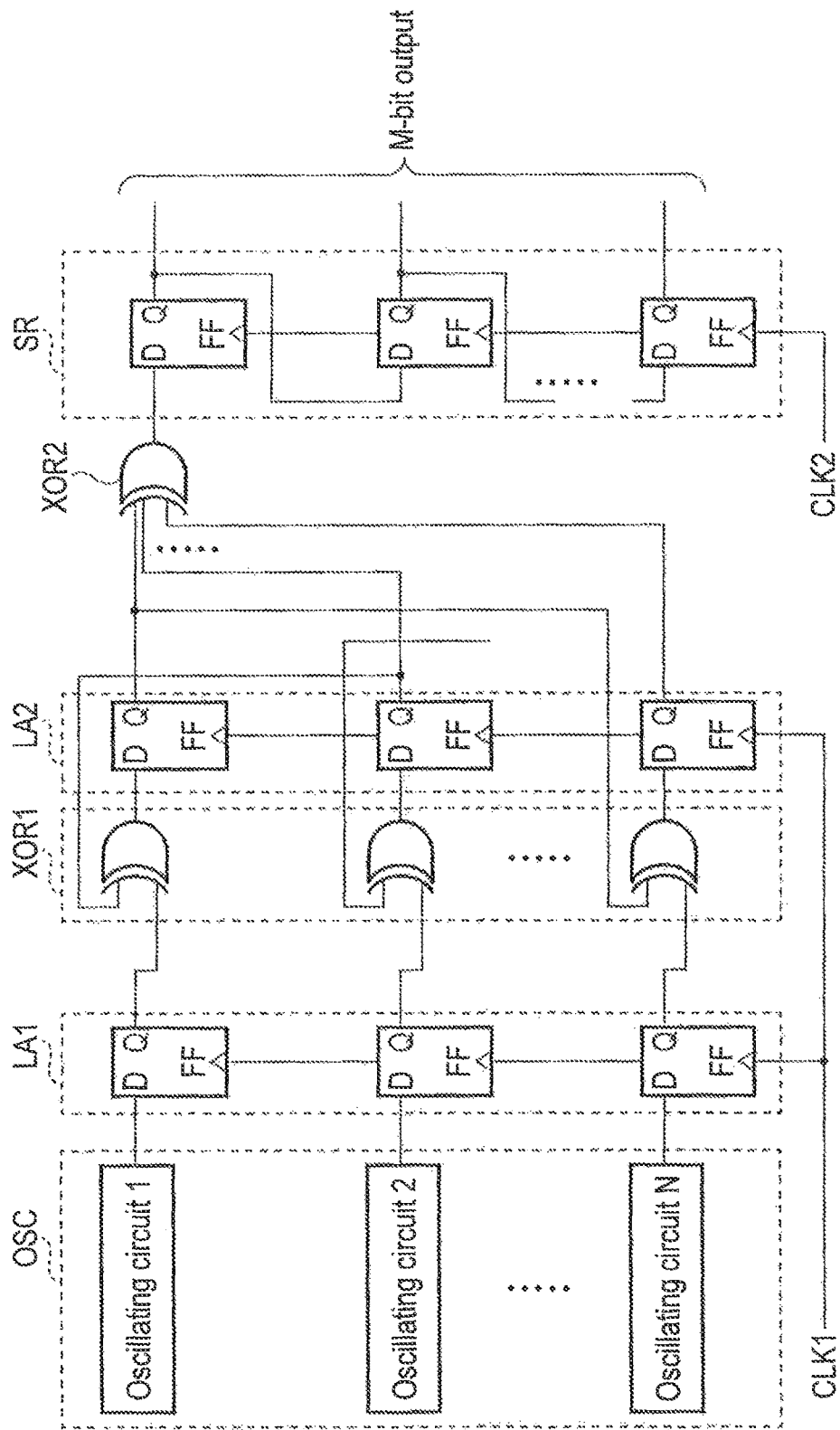
F I G. 10

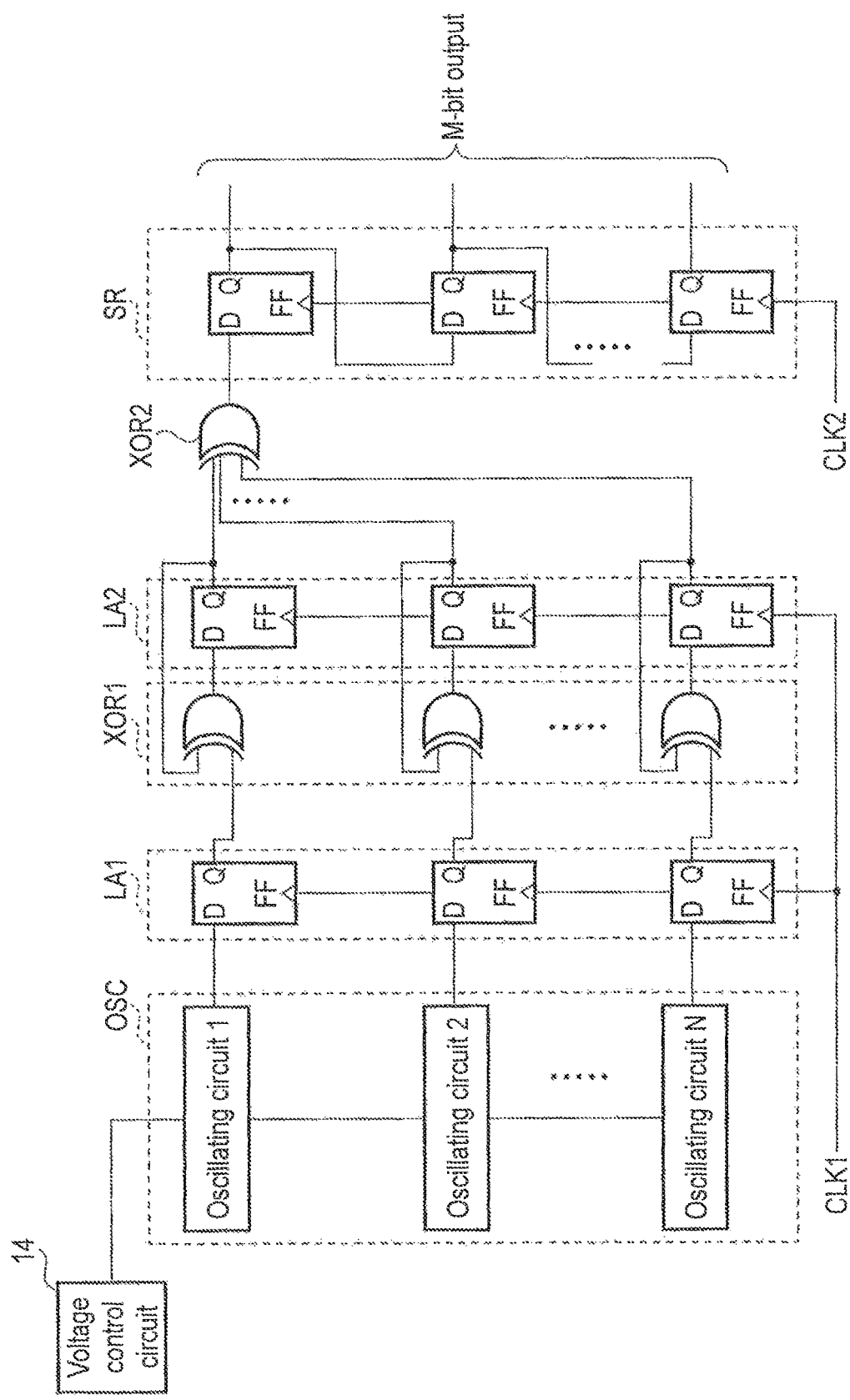
F I G. 11

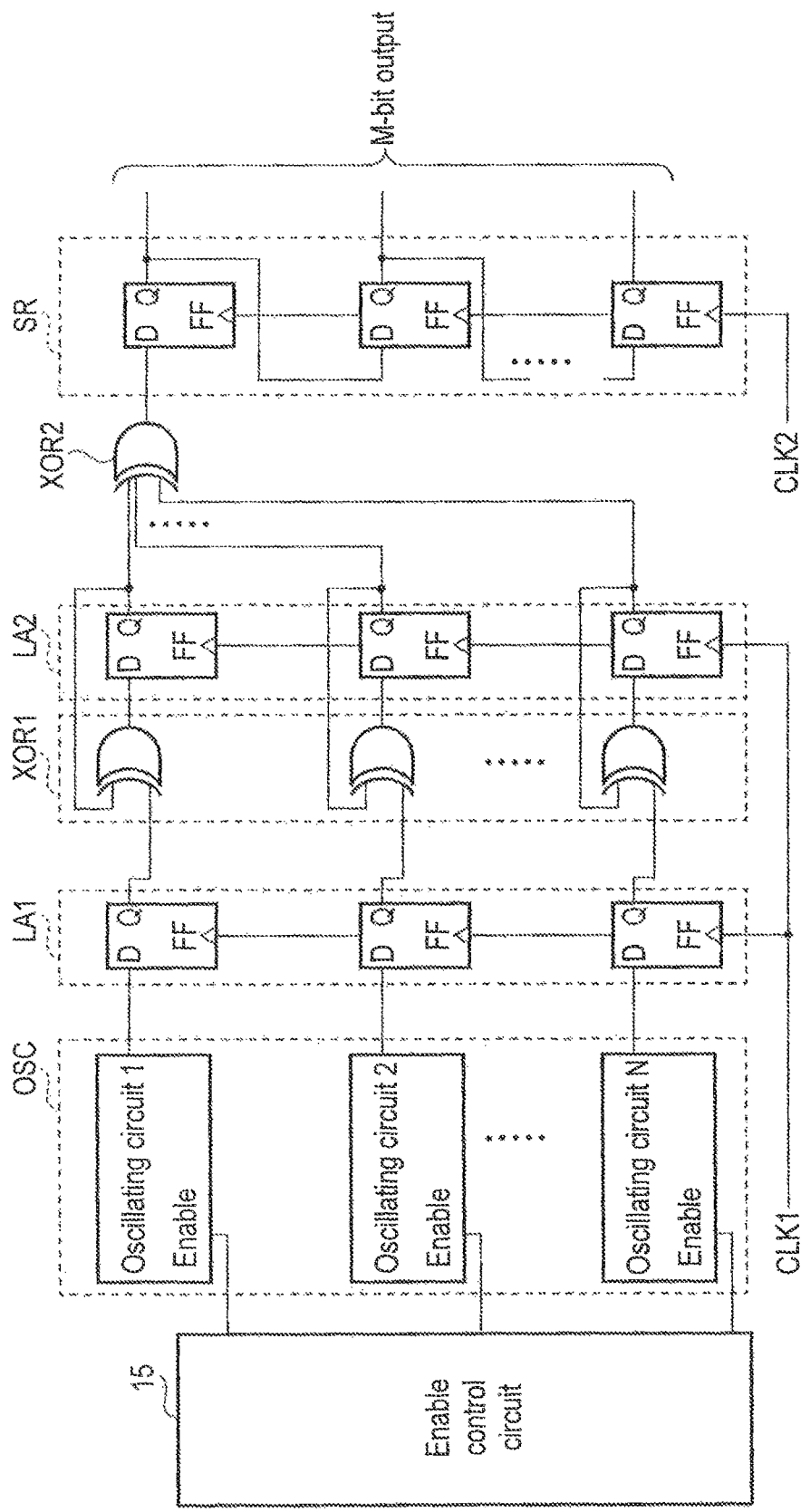
F I G. 12

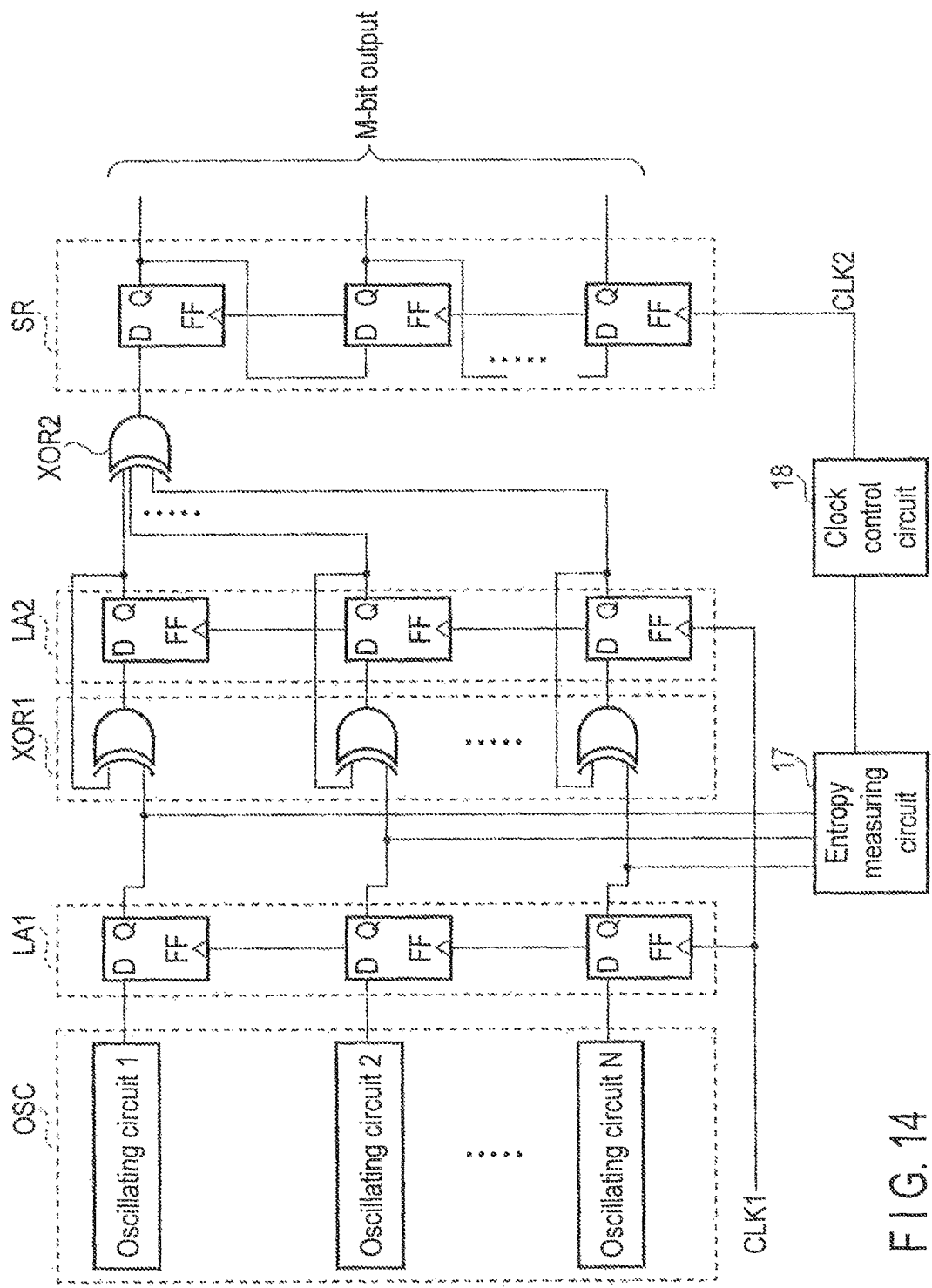
F I G. 14

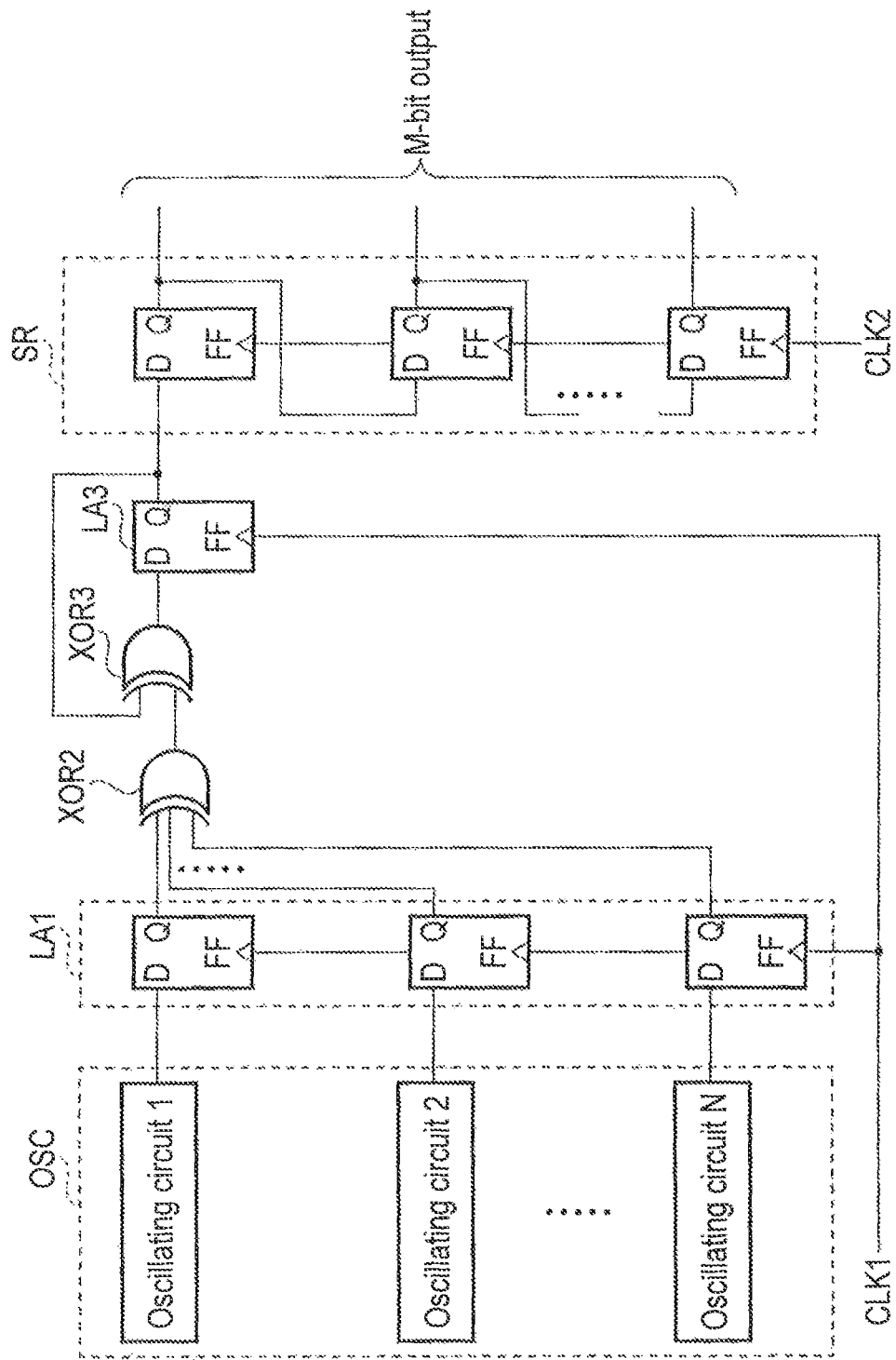
F I G. 15

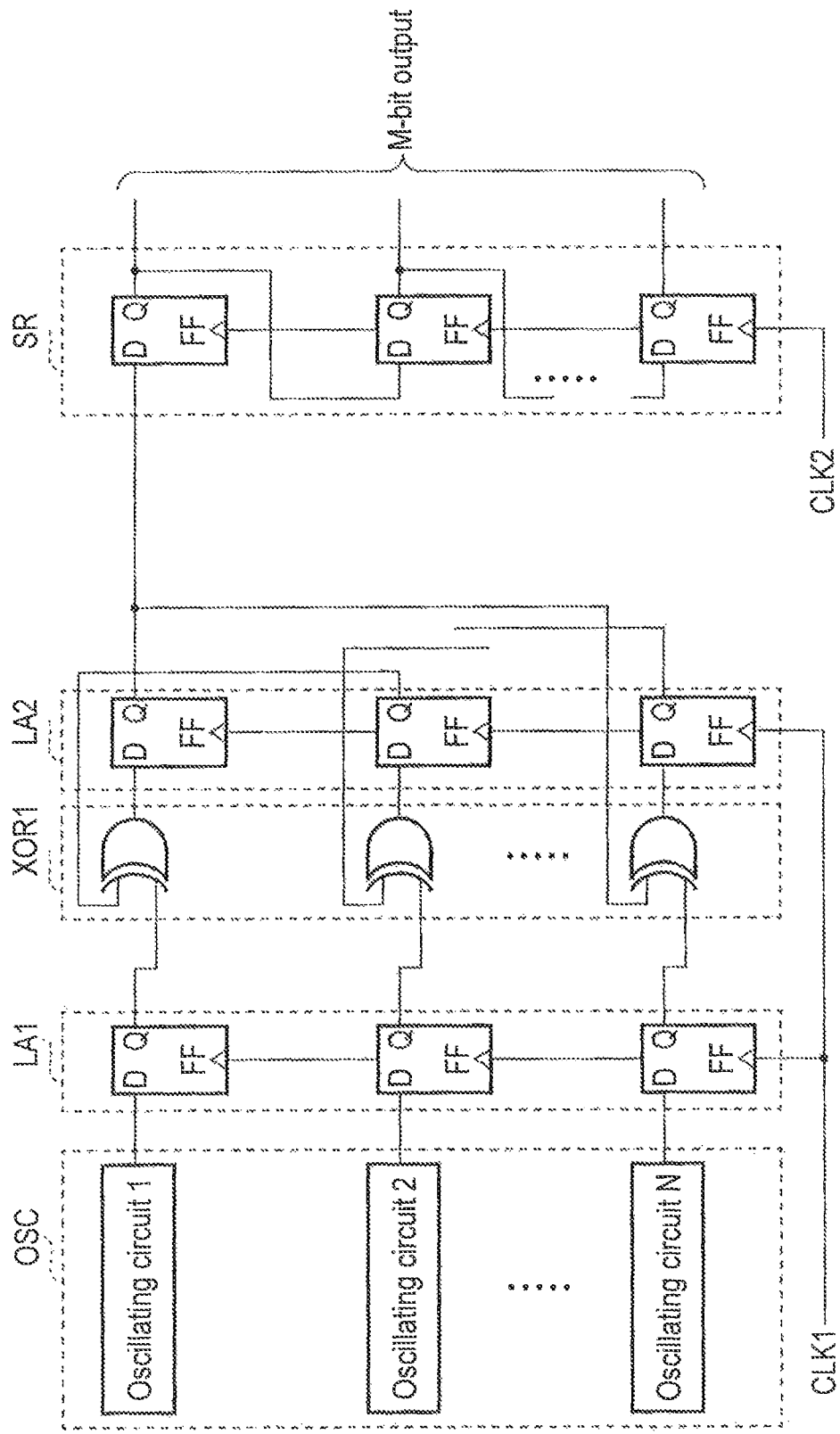
F I G. 17

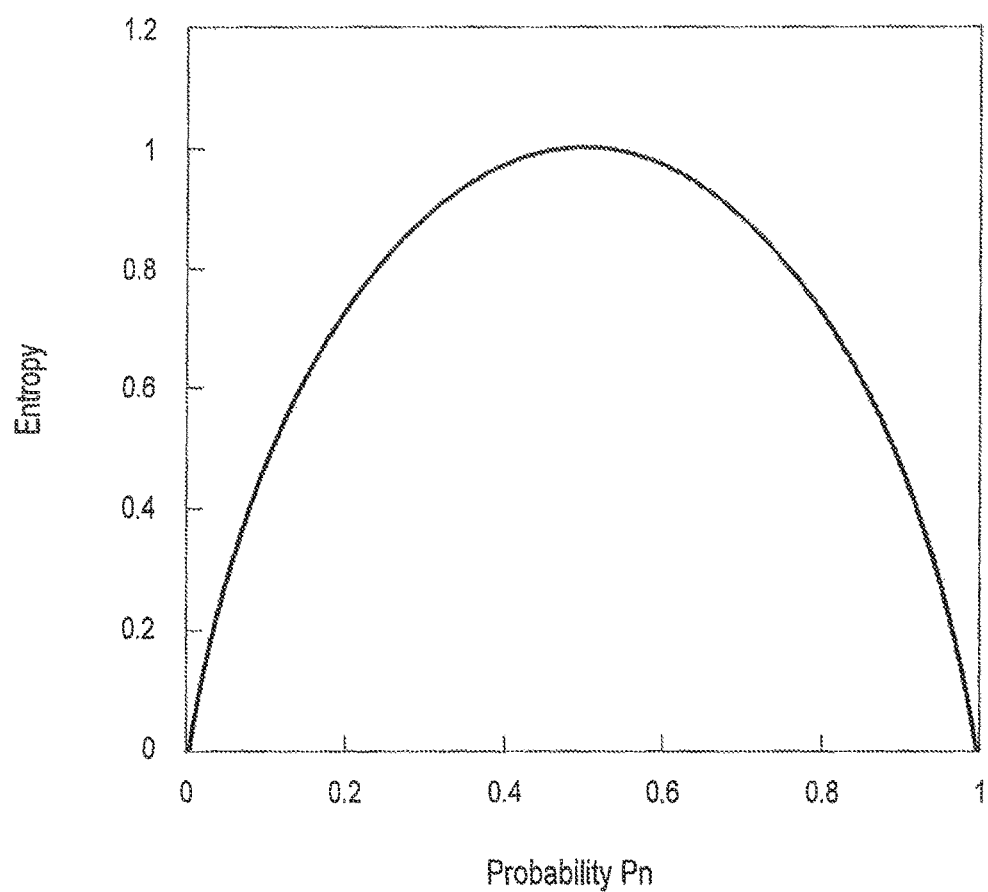
F I G. 18

RANDOM NUMBER GENERATING CIRCUIT

CROSS-REFERENCE TO RELATED APPLICATIONS

This application is based upon and claims the benefit of priority from Japanese Patent Application No. 2012-255734, filed Nov. 21, 2012, the entire contents of which are incorporated herein by reference.

FIELD

Embodiments described herein relate generally to a random number generating circuit.

BACKGROUND

With the development of information communication technology, demand for information security is growing. Unpredictability in information security technology depends on the level of randomness of random data used. That is, the security strength is increased by using data of increasing entropy used in information theory. For a 512-bit key, for example, security is reinforced with the entropy increasingly closer to 512.

A method of latching a fast oscillation signal by a sufficiently slower clock has been used as a method of generating random data. If jitter is on a fast oscillation signal, random output can be obtained because the phase of the oscillation signal fluctuates with respect to the clock timing. However, if this configuration is simply adopted, generation efficiency of random data varies depending on the clock timing and oscillation timing, and the amount of jitter, which makes the entropy smaller. In the worst case, the signal is always high or low and no random data is generated. That is, a circuit configuration showing considerable variation in performance is obtained under the influence of manufacturing variation.

A random data generating circuit and a smoothing circuit using a continuous oscillating circuit or intermittent oscillating circuit are known and the problem of variation cannot be avoided even if such an intermittent oscillating circuit is used. If the signal is always high or low, the smoothing circuit becomes useless and high-entropy data cannot be obtained.

According to the technology using a plurality of oscillating circuits or activating an oscillating circuit a plurality of times, performance of the oscillating circuit that outputs the maximum entropy among prepared circuits can be adopted by using the circuits, but more entropy cannot be obtained. According to the method of activating the same oscillating circuit a plurality of times, the method does not work and high-entropy data cannot be obtained if the signal is always high or low.

BRIEF DESCRIPTION OF THE DRAWINGS

FIGS. 4 and 5 are diagrams showing modifications of FIG. 1;
FIG. 10 is a diagram showing a second embodiment;
FIG. 11 is a diagram showing a third embodiment;
FIG. 12 is a diagram showing a fourth embodiment;
FIG. 14 is a diagram showing a sixth embodiment;
FIG. 15 is a diagram showing a seventh embodiment;
FIG. 17 is a diagram showing a modification of the second embodiment;
and
FIG. 18 is a diagram showing the relationship between the probability and entropy.

DETAILED DESCRIPTION

In general, according to one embodiment, a random number generating circuit comprising: first to N-th oscillating circuits (N is a natural number equal to 2 or greater); first to N-th latch circuits that latch outputs of the first to N-th oscillating circuits by a first clock having a first frequency; first to N-th exclusive OR circuits; (N+1)-th to (2×N)-th latch circuits that latch outputs of the first to N-th exclusive OR circuits by the first clock; an (N+1)-th exclusive OR circuit that outputs an exclusive OR of outputs of the (N+1)-th to (2×N)-th latch circuits; and an M-bit shift register that converts serial data output from the (N+1)-th exclusive OR circuit into M-bit parallel data (M is a natural number equal to 2 or greater) by a second clock having a second frequency, wherein the output of the i-th exclusive OR circuit is the exclusive OR of i-th feedback output of a subsequent circuit of the first to N-th exclusive OR circuits and the output of the i-th latch circuit (i is one of 1 to N), and the second frequency is equal to or lower than the first frequency.

The embodiments of a random number generating circuit (entropy source generating circuit) will be described below with reference to the drawings.

(First Embodiment)

Figure 1:
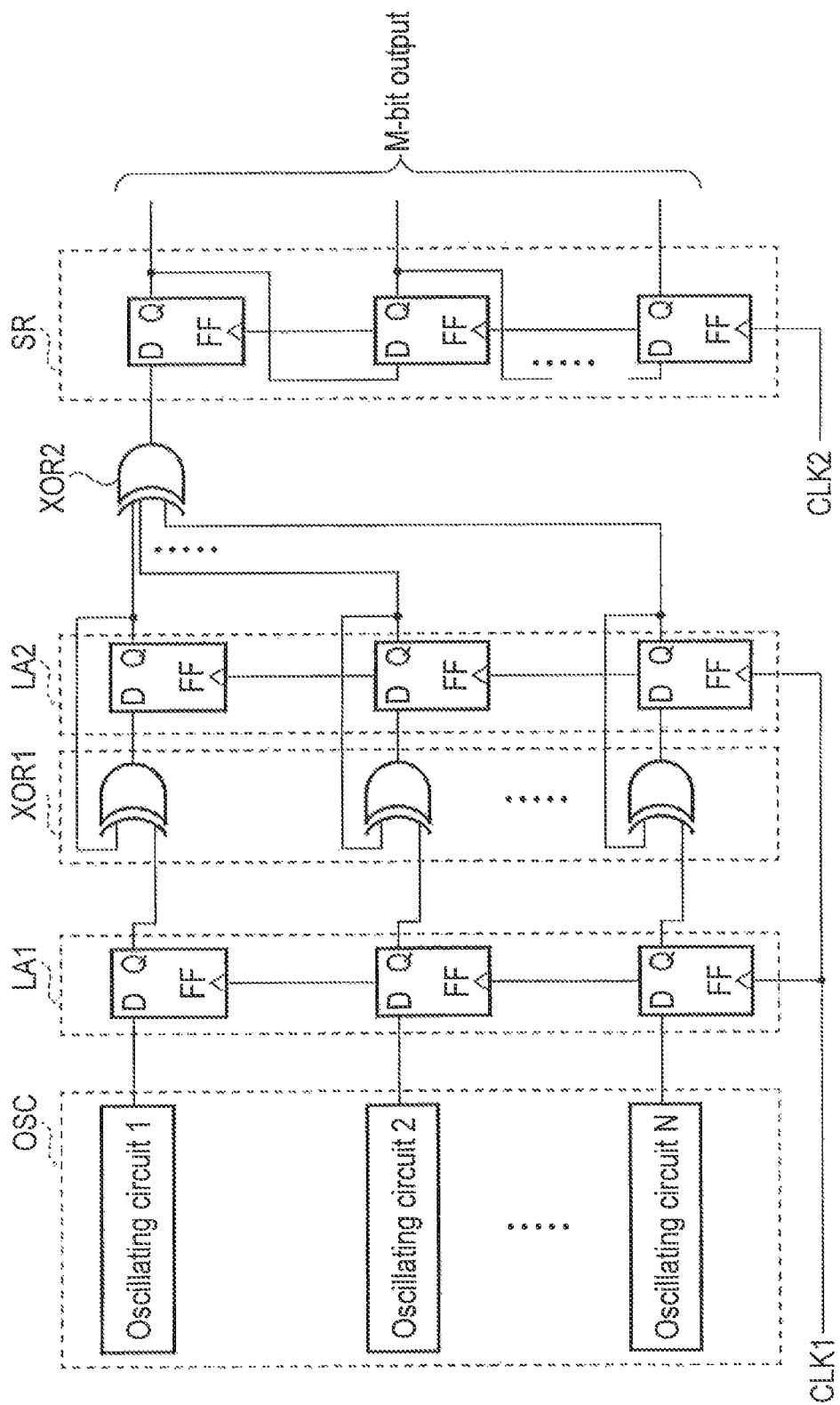
FIG. 1 is a diagram showing a first embodiment.

FIG. 1 is a first embodiment of an entropy source generating circuit.

The entropy source generating circuit is a circuit that outputs high-entropy data used for information security or the like.

First to N-th oscillating circuits (N is a natural number equal to 2 or greater) OSC each output an oscillation signal ("0"/"1" signal). First to N-th latch circuits LA1 latch output from the first to N-th oscillating circuits OSC by a first clock CLK1 having a first frequency. The output from the first to N-th latch circuits LA1 is input into first to N-th exclusive OR circuits XOR1.

(N+1)-th to (2×N)-th latch circuits LA2 latch output from the first to N-th exclusive OR circuits XOR1 by the first clock CLK1. Here, the output of the i-th exclusive OR circuit is an exclusive OR of the output of the i-th latch circuit and the output of the (N+i)-th latch circuit, where i is one of 1 to N.

An N-input exclusive OR circuit XOR2 outputs an exclusive OR of the output of the (N+1)-th to (2×N)-th latch circuits. An M-bit shift register SR converts serial data output from the N-input exclusive OR circuit XOR2 into M-bit parallel data (M is a natural number equal to 2 or greater) by a second clock CLK2 having a second frequency.

The second frequency of the second clock CLK2 is equal to or less than the first frequency of the first clock. For example, the second clock CLK2 can be set as a clock obtained by dividing the first clock CLK1 by X (X is a natural number). Flip-flop circuits FF may be adopted for each of the first to N-th latch circuits LA1 in the first stage and the (N+1)-th to (2×N)-th latch circuits LA2 in the second stage.

When N is large, the circuit scale of the N-input exclusive OR circuit XOR2 increases and the signal delay increases. Thus, the N-input exclusive OR circuit XOR2 can be changed to multistage connection of N'-input exclusive OR circuits, where N'<N.

The N flip-flop circuits FF in the first stage output uncertain data by forcibly latching oscillating signals of the N oscillating circuits OSC. However, the data may have, as described above, low output entropy due to variations or the like.

Thus, all influences of data output from the N flip-flop circuits FF in the first stage are retained by self-feedback of the N exclusive OR circuits XOR1 and the N flip-flop circuits FF in the second stage.

If, for example, data output in the n-th clock from the oscillating circuit 1 is An, the output of the exclusive OR circuit in a subsequent stage of the oscillating circuit 1 is given by First clock: A0⊕A1 (A0 is the initial value of output of FF in the second stage, ⊕ indicates an exclusive OR)
Second clock: A0⊕A1⊕A2
Third clock: A0⊕A1⊕A2⊕A3
. . .

and influences of all data beginning with the initial value are retained.

When entropy is low and the output probability of random data is low, the expected value of generating random data needs to be increased by operating the N oscillating circuits OSC many times and random data losses can be avoided by the N exclusive OR circuits XOR1.

If the probability of output of 0 from the N flip-flop circuits FF in the first stage is q and the probability that the output in the n-th clock of the N exclusive OR circuits XOR1 is $P_n$, the following equation can be set up:

$$P_{n+1}=P_n \times q+(1-P_n) \times (1-q) \quad (1)$$

Figure 2:
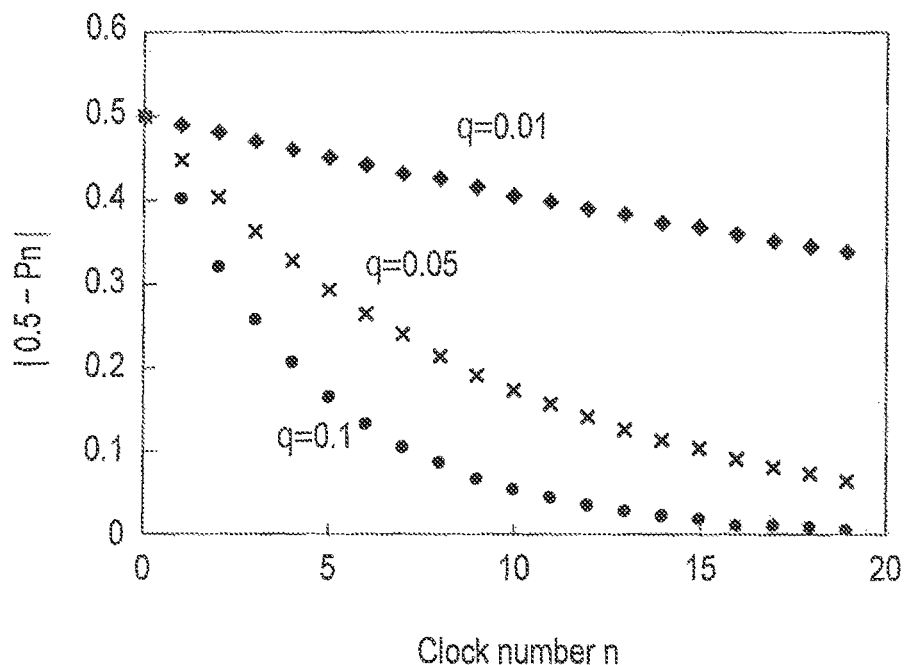
FIG. 2 is a diagram showing the relationship between a clock number and the probability of 0.
Figure 3:
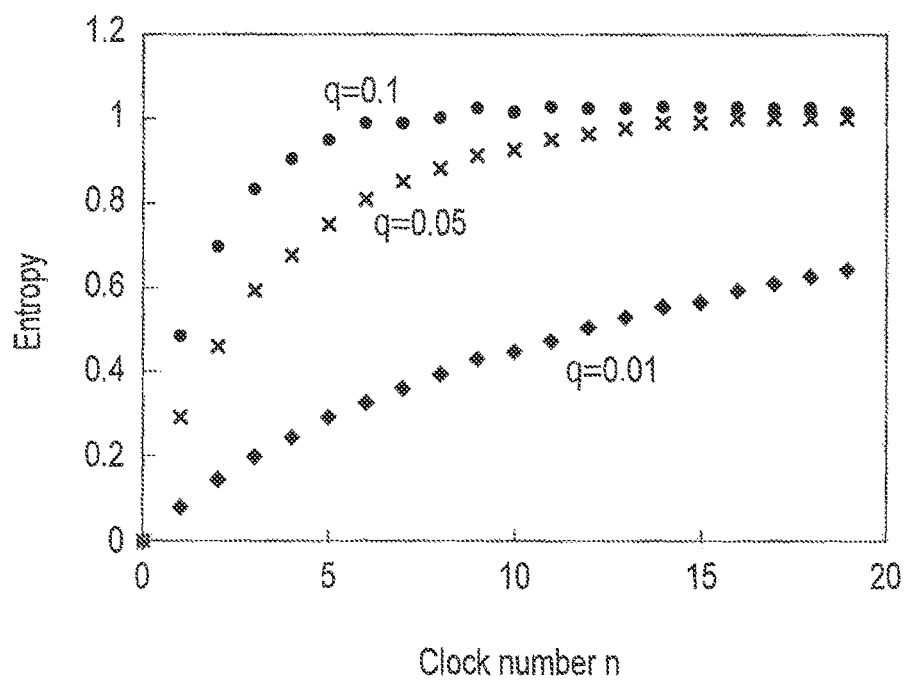
FIG. 3 is a diagram showing the relationship between the clock number and entropy.

$P_n$ approaches 0.5 as n increases (FIG. 2).
Entropy $H_n$ of 1 bit is given by $$H_n=-(P_n \times \log_2(P_n)+(1-P_n) \times \log_2(1-P_n)) \quad (2)$$

and thus, entropy can be increased by operating the N oscillating circuits OSC many times (FIG. 3).

That is, even if the output of the N oscillating circuits OSC and the N flip-flop circuits FF in the first stage is low entropy, high-entropy output can be obtained.

However, the self-feedback of the N exclusive OR circuits XOR1 and the N flip-flop circuits FF in the second stage has no effect when the output of the N oscillating circuits OSC is always high or low. Thus, all outputs of the N oscillating circuits OSC are converted into 1-bit data by using the exclusive OR. In this manner, even if some oscillating circuits do not work, random data can still be generated if at least one oscillating circuit capable of generating random data is present.

The number N of oscillating circuits may be any number equal to 2 or greater.

However, as a property of the exclusive OR, when an exclusive OR of outputs of two perfectly correlated oscillating circuits is calculated, the effect of generating random data by the two oscillating circuits may be lost. That is, when N is an even number, the effect of generating random data is lost if all outputs of oscillating circuits are correlated.

Thus, N is desirably an odd number. If N is an odd number, even if two oscillating circuits should have correlated outputs, at least one oscillating circuit can always avoid being correlated with other oscillating circuits and the effect of generating random data is not lost.

Data converted into 1-bit data by the N-input exclusive OR circuit XOR2 is again converted into multi-bit data by a shift register SR. However, when data is converted into multi-bit data by the shift register SR, successive two bits are correlated. When, for example, 2-bit data of the n-th clock and the (n+1)-th clock is output, total entropy $TH_n$ is the sum of entropy of each bit, but both bits are correlated and thus, it is necessary to subtract randomness accumulated up to the n-th clock from data of the (n+1)-th clock. That is, using 1-bit entropy $H_n$ of the n-th clock, $TH_n$ is given by $$TH_n=H_n+H_1$$

When entropy generated by one clock after the N-input exclusive OR circuit XOR2 is high, the shift register SR can be caused to successively output at the same frequency as the first clock CLK1. This is a case when randomness of output of the N oscillating circuits OSC and the N flip-flop circuits FF in the first stage is high. Otherwise, the frequency of the second clock CLK2 at which the shift register SR is caused to operate is made lower than the frequency of the first clock CLK1.

That is, data accumulating entropy for each bit may be output by making the period of the second clock CLK2 longer than the period of the first clock CLK1, for example, by setting the clock obtained by dividing the first clock CLK1 by X (clock obtained by thinning out some clocks of the first clock CLK1) as the second clock CLK2.

For example, as shown in FIG. 4, the frequency of the first clock CLK1 is divided by X (X is a natural number) by a frequency divider 10. That is, the first clock CLK1 is input into a counter 11 and the counter 11 can be caused to output the second clock CLK2 obtained by dividing the first clock CLK1 in accordance with the value (X) of a register 12 connected to the counter 11.

In this manner, the second clock CLK2 obtained by thinning out the first clock CLK1 by the number of cycles (X) set to the register 12 can be generated.

Figure 5:
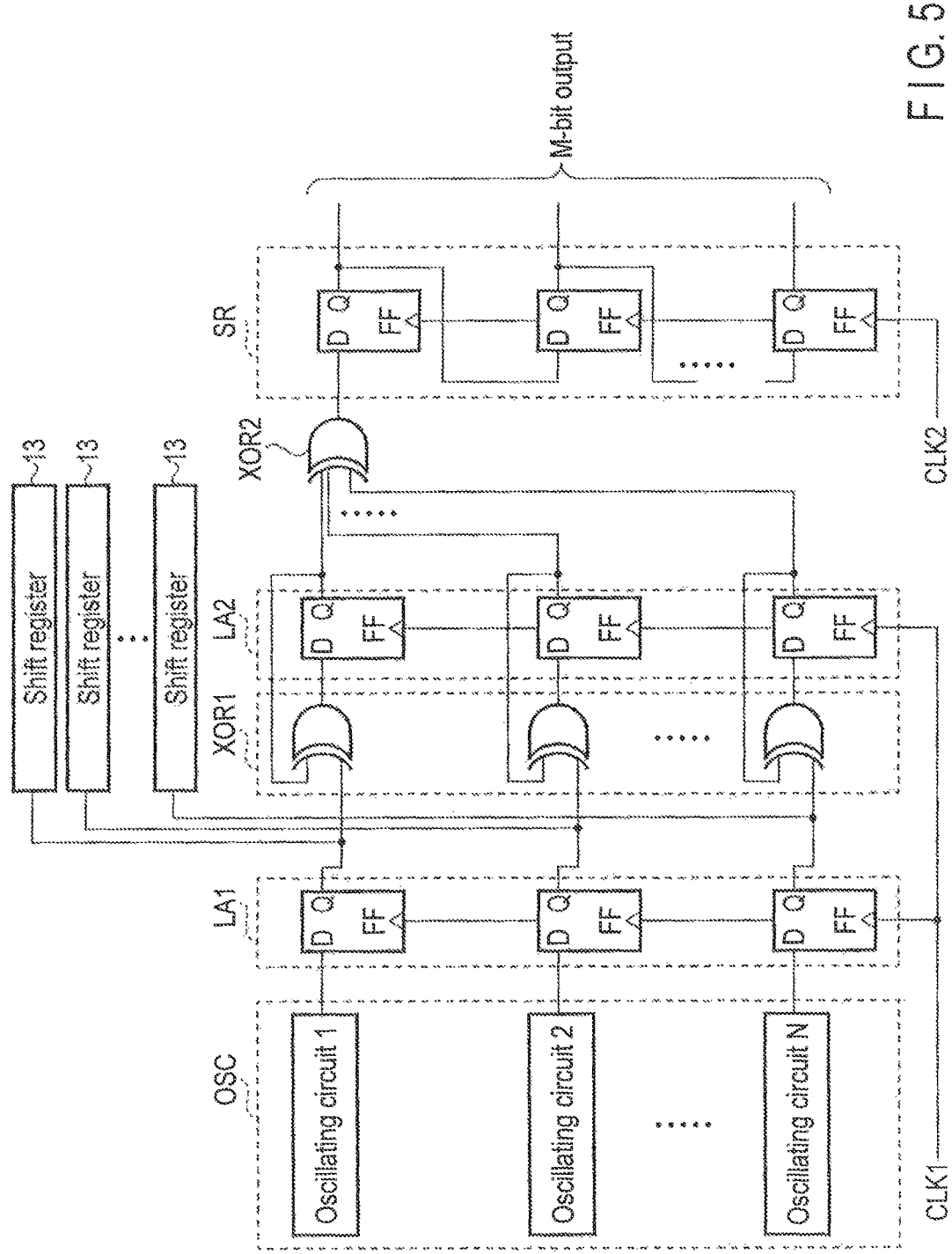

How much to thin out second clock CLK2 can be predicted by monitoring output of the N flip-flop circuits FF in the first stage to estimate the entropy currently being generated. As a method of monitoring output of the N flip-flop circuits FF in the first stage, for example, as shown in FIG. 5, a monitoring shift register 13 is connected to output of the N flip-flop circuits FF in the first stage. Then, "0 (Low)"/"1 (High)" variations of the N flip-flop circuits FF in the first stage are measured to be able to calculate entropy. The longer the measurement by the shift register 13, the more correct the measurement is.

Figure 6:
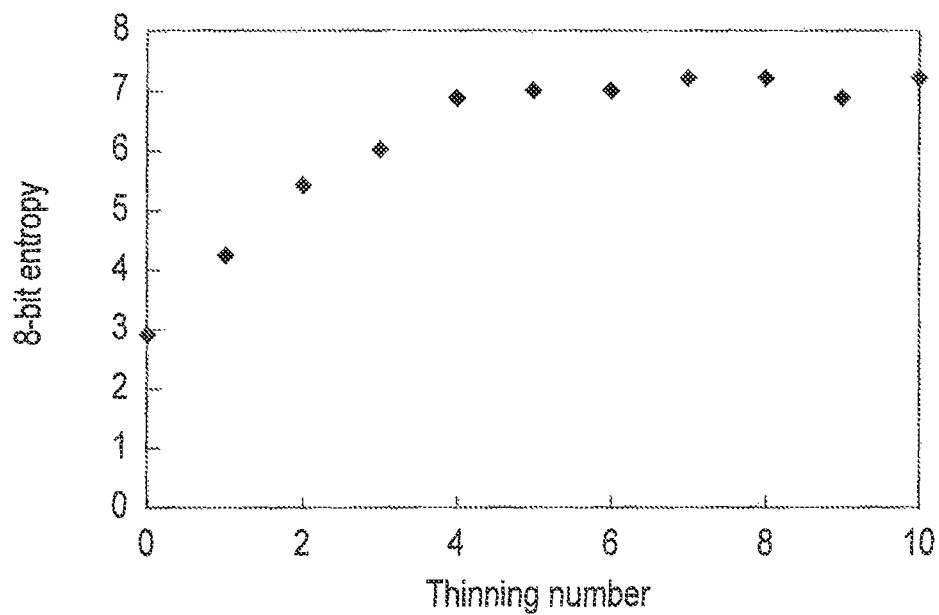
FIG. 6 is a diagram showing the relationship between a thinning number and entropy.

FIG. 6 is a result showing a state of the thinning number and an increase in entropy when 8-bit output entropy is 2.9 for the thinning number of 0.

It is clear from FIG. 6 that the entropy increases with an increasing thinning number, that is, with a decreasing frequency of the second clock CLK2 from the frequency of the first clock CLK1. The inclination of an increase in entropy depends on entropy output in a cycle and entropy of the amount calculated by Formula (2) increases for a thinning number n. That is, by estimating entropy from output of the N flip-flop circuits FF in the first stage, how large the thinning number should be can be predicted.

If the initial state is assumed to be "0 (Low)", from Formula (1), $$P_n=((2q-1)^n+1)/2 \quad (3)$$

is obtained. By assuming the ratio of 0 obtained from the shift register 13 artificially as the probability q, the probability $P_n$ of 0 in the n-th clock can be predicted from Formula (3).

Conversely, if $P_n$ as the target is set, from formula (3)

$$n=\log |2P_n-1|/\log |2q-1| \quad (4)$$

is obtained to be able to estimate the necessary clock number n.

If, for example, the required entropy is h for M-bit output, the entropy that needs to be held by data for each bit can be considered to be h/M. In this case, the needed probability $P_n$ is determined from Formula (2) and FIG. 18. When the needed probability $P_n$ is known, the needed clock number n can be estimated from Formula (4).

That is, if "0 (Low)"/"1 (High)" variations of the N flip-flop circuits FF in the first stage and the target entropy are known, the needed thinning number can be predicted.

The N oscillating circuits OSC may be continuous oscillating circuits or intermittent oscillating circuits, but as suggested in Patent Literature 1, intermittent oscillating circuits are advantageous in terms of power consumption.

Figure 7:
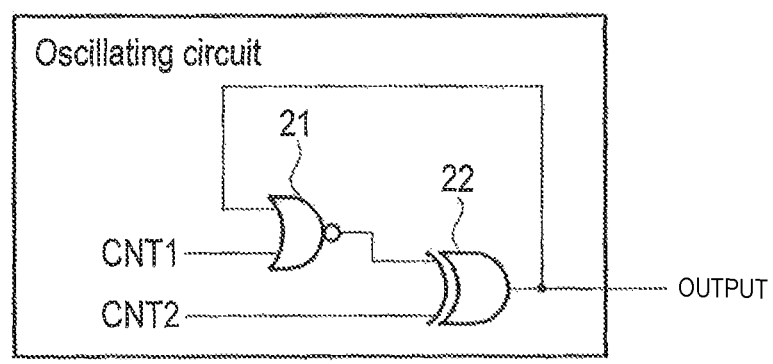
FIG. 7 is a diagram showing an example of an intermittent oscillating circuit.

FIG. 7 shows an example of the intermittent oscillating circuit.

The oscillating circuit includes a 2-input NOR circuit 21 and a 2-input exclusive OR (XOR) circuit 22. A first control signal CNT1 is input into the 2-input NOR circuit 21. A second control signal CNT2 and the output of the NOR circuit 21 are input into the 2-input exclusive OR circuit 22. The output (oscillating signal) of the 2-input exclusive OR circuit 22 is input into the 2-input NOR circuit 21 as a feedback signal.

When the first control signal CNT1 is "0 (Low)" in this oscillating circuit, the NOR circuit 21 is equivalent to an inverter. When the first control signal CNT1 is "1 (High)", the output of the NOR circuit 21 is "0 (fixed)" and does not oscillate. That is, the first control signal CNT1 an be used as an oscillation trigger signal and power consumption can be reduced by using the first control signal CNT1 when the entropy source generating circuit in the present example is stopped.

When the second control signal CNT2 is "0", the exclusive OR circuit 22 outputs the output of the NOR circuit 21 unchanged. When the second control signal CNT2 is "1", the exclusive OR circuit 22 is equivalent to an inverter. That is, when the first control signal CNT1 is "0", the oscillation state and the latched state can be switched by the second control signal CNT2.

When, for example, the second control signal CNT2 should be synchronously divided by the first clock CLK1, two methods, a random data generation method of forcibly latching the oscillation state by the flip-flop circuit FF and a random data generation method of forcibly latching in the oscillating circuit from the oscillation state by switching the second control signal CNT2, are executable.

Even if there is a difference of the random data generation probability between the latch by the flip-flop circuit FF and the self-latch due to element variations or the like, the generation efficiency can be improved by using the present circuit.

Of course, the same function can be obtained by using other logic gates. For example, NAND circuit and XNOR circuit can be used instead of NOR circuit and XOR circuit respectively.

The timing of the first control signal CNT1 and the second control signal CNT2 may be made common to the N oscillating circuits OSC or separate. Particularly, the second control signal CNT2 operates the N oscillating circuits OSC independently and thus, it is more effective to shift the phase of each circuit. For example, signals of different phases may be given to N bits of the second control signal CNT2 or phases having a 180° phase difference may be given to adjacent oscillating circuits.

Random data output from the N flip-flop circuits FF in the first stage is desirably independent of each other. If the random data is correlated, even if a pair of the N oscillating circuits OSC and the N flip-flop circuits FF in the first stage is provided, the pair is practically equivalent to a pair of smaller numbers of the oscillating circuits and the flip-flop circuits FF. Therefore, in addition to, as described above, changing the phase of the second control signal CNT2, it is effective to separate the position where each oscillating circuit is mounted from each other, instead of concentrating the positions in one place inside the chip. Or, it is also effective to set the control signal CNT2 of one or plural oscillating circuits OSC to fixed value, and use the oscillating circuits as continuous oscillating circuits.

Figure 8:
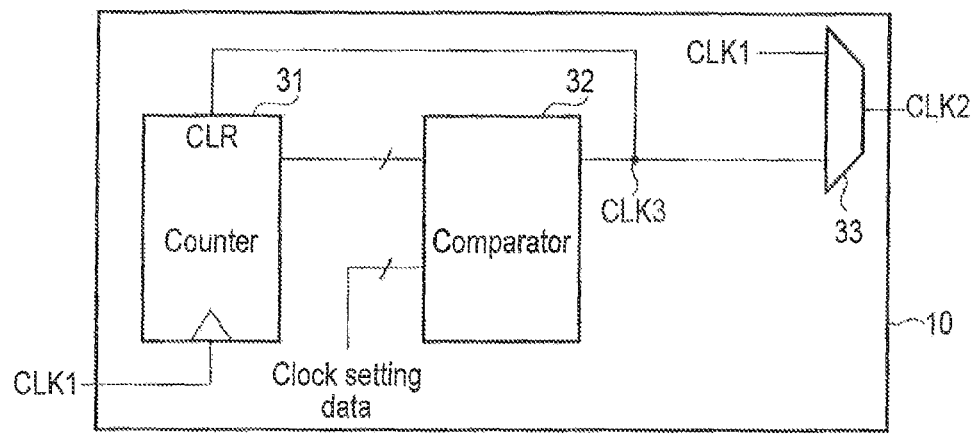
FIG. 8 is a diagram showing a circuit that generates a second clock.

FIG. 8 is an example of the circuit that generates the second clock CLK2.

The circuit functions as the frequency divider 10 that divides the frequency of the first clock CLK1 by X (X is a natural number). The frequency divider 10 selectively outputs the first clock CLK1 or one of clocks obtained by dividing the first clock by X' (X' is a natural number equal to 2 or greater) as the second clock CLK2.

For example, a counter 31 is operated by the first clock CLK1 to count the clock number of the first clock CLK1 by the counter 31. The count number and clock setting data are compared by a comparator 32. When both match, a thinned clock CLK3 is started up. Also, the counter 31 is reset by using the startup of the thinned clock CLK3 as a trigger.

Then, one of the first clock CLK1 and the thinned clock CLK3 is selected by a multiplexer 33 in the end. The clock selected by the multiplexer 33 is output as the second clock CLK2.

By making the first clock CLK1 selectable by using the multiplexer 33 in this manner, the second clock CLK2 having the same frequency as the first clock CLK 1 can be generated. If the thinned clock CLK3 is selected, the second clock CLK2 having a lower frequency than the first clock CLK1 can be generated.

If the above configuration is adopted, the frequency of the second clock CLK2 can arbitrarily be set after the chip production by setting the clock setting data by using software or the like.

Figure 9:
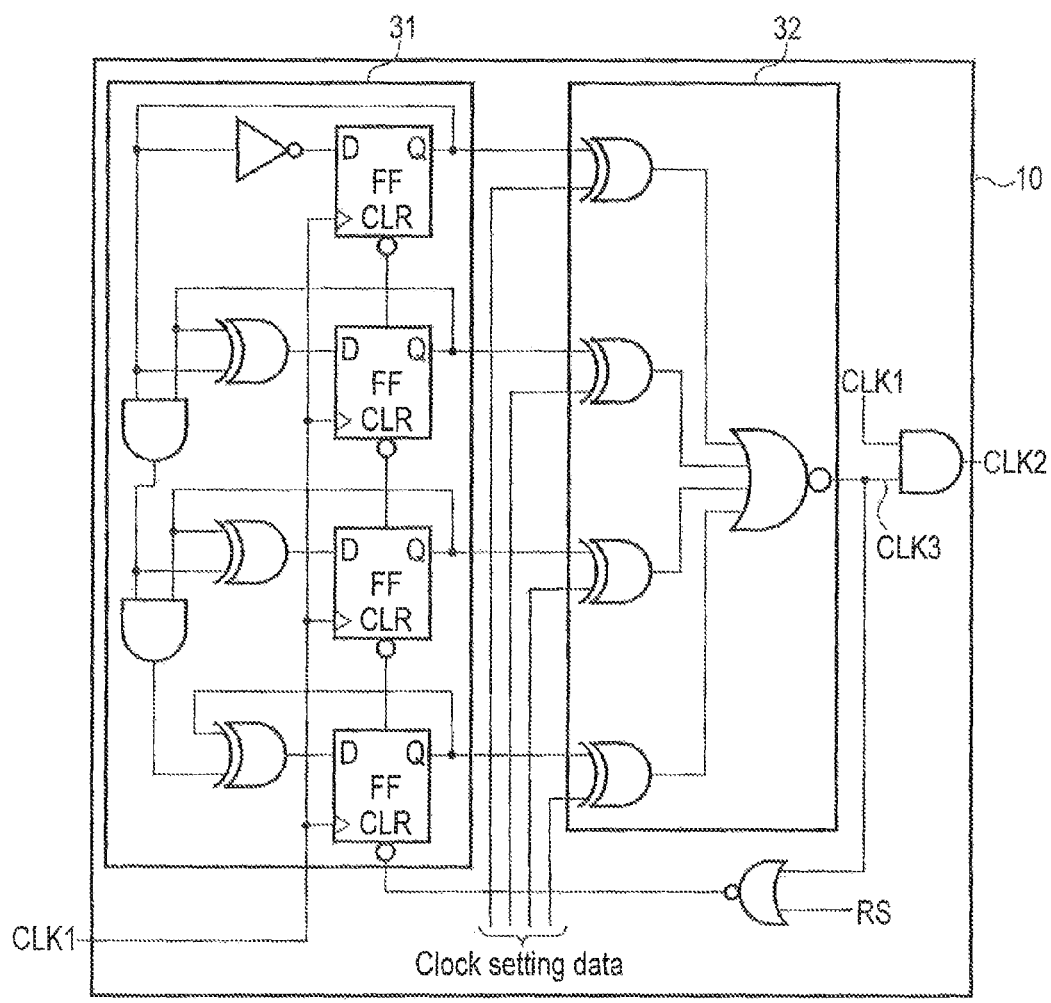
FIG. 9 is a circuit diagram that embodies the configuration of FIG. 8.
Figure 16:
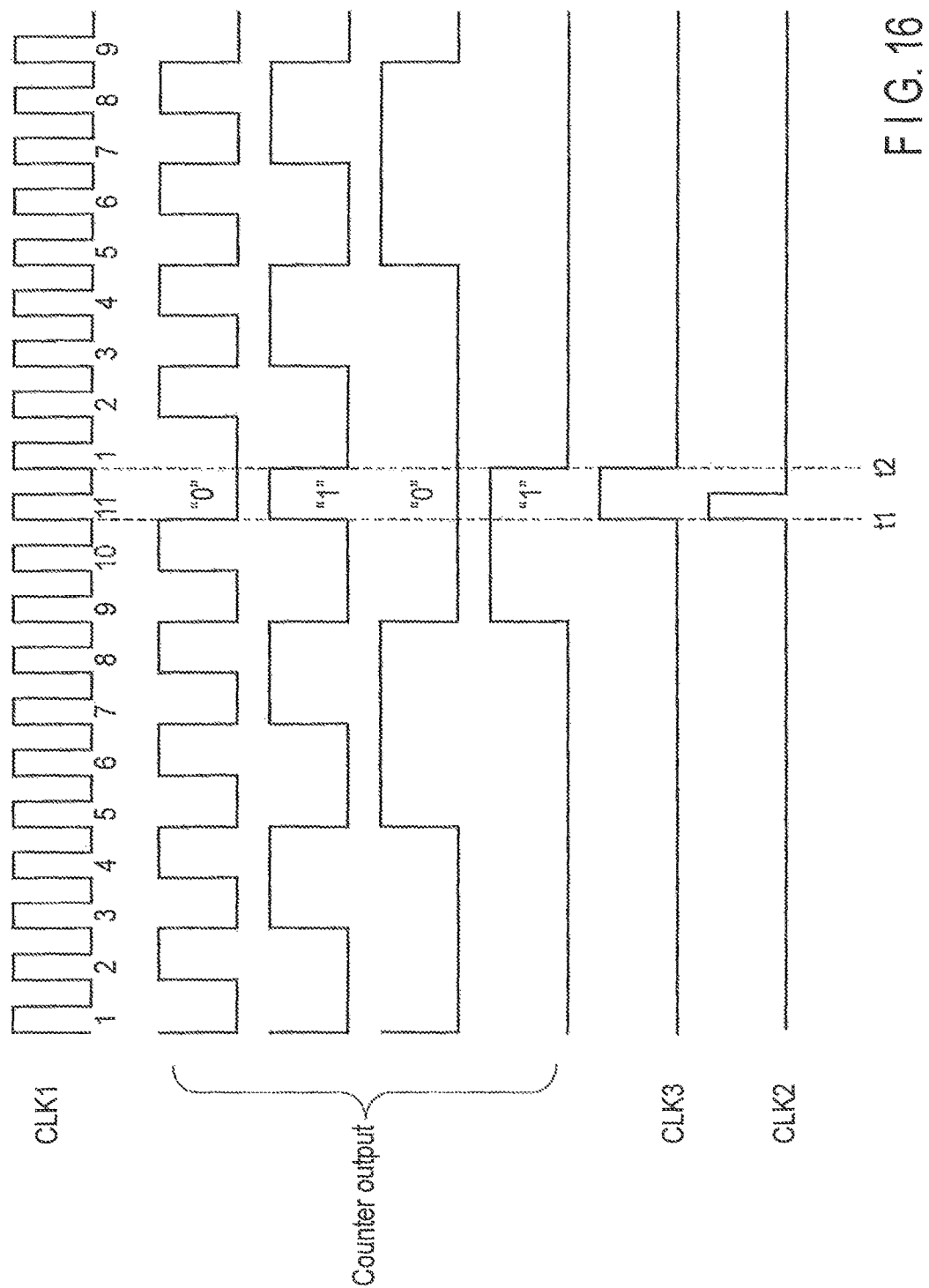
FIG. 16 is a timing chart showing the operation of the circuit of FIG. 9.

FIG. 9 is a circuit diagram that embodies the configuration of FIG. 8. FIG. 16 shows a timing chart.

Here, a circuit capable of thinning out clocks between 0 and 15 clocks by using a 4-bit counter as the counter 31 is shown. However, instead of a multiplexer, an AND circuit is used here as the circuit to select the first clock CLK1.

Outputs of the four flip-flop circuits FF counted up by the first clock CLK1 and clock setting data are compared by four exclusive OR circuits in the comparator 32. When comparison results match in all the exclusive OR circuits, outputs of all the exclusive OR circuits become "0" and the output of a 4-input NOR circuit as the output of the comparator 32 becomes "1".

In the example of the timing chart in FIG. 16, the clock setting data is assumed to be ["0", "1", "0", "1"]. In this case, the clock setting data and the output of the counter 31 match in the 11-th clock (time 1) after starting to count by using the 4-bit counter. Therefore, the thinned clock CLK3 is generated.

When the timing of the thinned clock CLK3 and the timing of the first clock CLK1 match, the second clock CLK2 is started up.

Further, when the present circuit is operating, a reset signal RS is "0" and thus, the four flip-flop circuits FF are reset when the thinned clock CLK3 is "1". That is, the counter 31 starts to count from 1 at time t2.

When all bits of the clock setting data (4 bits) are set to "0 (Low)" in the present circuit, the four flip-flop circuits FF always maintain the initial state (reset state in which all outputs are "0") and also outputs all exclusive OR circuits are always "0".

Therefore, when all bits of the clock setting data (4 bits) are set to "0", the thinned clock CLK3 is always in the "1 (High)" state and so the second clock CLK 2 output from the AND circuit is the same as the first clock CLK1.

(Second Embodiment)

FIG. 10 is a second embodiment of the entropy source generating circuit.

In the present example, self-feedback by exclusive OR circuits between flip-flop circuits FF in the first stage and flip-flop circuits FF in the second stage is given between mutually different N exclusive OR circuits. That is, random data is put together by an N-input exclusive OR circuit XOR2 in the next stage and thus, the self-feedback does not have to be given by the same exclusive OR circuits.

Here, self-feedback of exclusive OR circuits in the subsequent stage of an oscillating circuit 1 is given by the output (output by FF) of exclusive OR circuits in the subsequent stage of an oscillating circuit 2 and similarly, self-feedback of exclusive OR circuits in the subsequent stage of oscillating circuits 2 to (N−1) is given by the output (output by FF) of exclusive OR circuits in the subsequent stage of oscillating circuits 3 to N.

Self-feedback of exclusive OR circuits in the subsequent stage of the oscillating circuit N is given by the output (output by FF) of exclusive OR circuits in the subsequent stage of the oscillating circuit 1.

According to the present example, an output signal of each oscillating signal can be linked by the self-feedback and thus, as shown in FIG. 17, the N-input exclusive OR circuit XOR2 in FIG. 10 can be omitted. In this case, when compared with the example in FIG. 10, the example in FIG. 17 achieves an effect of being able to make the circuit scale smaller.

In the present example, the feedback destination can appropriately be changed for the purpose of making the wiring length of the self-feedback as short as possible during circuit design or mounting.

(Third Embodiment)

FIG. 11 is a third embodiment of the entropy source generating circuit.

In the present example, a voltage control circuit 14 is newly provided as a power supply of N oscillating circuits OSC. Whether data latched by flip-flop circuits FF in the first stage is random depends on each of the oscillation timing of N oscillating circuits OSC and the timing of the first clock CLK1. If, for example, the first clock CLK1 becomes "1" in the timing of the transition of output of the N oscillating circuits OSC, N flip-flop circuits in the subsequent stage FF becomes meta-stable and the output thereof is undefined.

However, if the first clock CLK1 becomes "1" when the output of the N oscillating circuits OSC is "1 (High)" or "0 (Low)", the N flip-flop circuits FF in the subsequent stage output "1" or "0" and thus, random data cannot be obtained.

Therefore, when it is determined that the output of the N flip-flop circuits FF in the subsequent stage is not random data, the supply voltage of the N oscillating circuits OSC is changed by the voltage control circuit 14.

That is, the oscillating frequency of the N oscillating circuits OSC depends on the supply voltage and thus, settings can be made so that the first clock CLK1 becomes "1" in the timing of the transition of output of the N oscillating circuits OSC by changing the oscillating frequency of the N oscillating circuits OSC. Accordingly, random data can be generated.

An example of controlling the oscillating frequency by the supply voltage of the N oscillating circuits OSC is shown in the present example, but instead thereof or together therewith, the oscillating frequency may be controlled by other elements such as the ground voltage and the substrate voltage.

There is no need for all the N oscillating circuits OSC to be commonly connected to the voltage control circuit 14. That is, the control of the oscillating frequency (for example, the control of the supply voltage) of the N oscillating circuits OSC may be exercised independently or the N oscillating circuits OSC may be divided into a plurality of groups, each of which to be controlled independently.

The effect of generating entropy is increased by, rather than providing a voltage control circuit common to all the N oscillating circuits OSC, providing, for example, a voltage control circuit to each of the N oscillating circuits OSC independently so that the oscillating frequency of the N oscillating circuits OSC can be controlled independently and appropriately, though the circuit scale grows.

(Fourth Embodiment)

FIG. 12 is a fourth embodiment of the entropy source generating circuit.

In the present example, an enable terminal to control the start/end of an oscillation operation is provided in each of N oscillating circuits OSC. When, for example, the intermittent oscillating circuit in FIG. 7 is used as the oscillating circuit, a first control signal CNT1 or a second control signal CNT2 can be used as an enable signal to control the start/end of the oscillation operation.

Then, an enable control circuit 15 is connected to the N oscillating circuits OSC. The enable control circuit 15 outputs an enable signal to each of the N oscillating circuits OSC.

As described above, whether data latched by N flip-flop circuits FF in the subsequent stage becomes random changes depending on the oscillation period of the N oscillating circuits OSC and the timing of a first clock CLK 1. That is, the same value will always be output if the oscillation period or the clock timing is not optimum.

When viewed from the effect of generating random data, whether an oscillating circuit continuing to always output the same value is operating or stopped does not influence the effect at all. Therefore, the oscillating circuit in such a state is stopped by an enable signal.

Accordingly, power consumption of the entropy source generating circuit can be reduced. In addition, entropy can be generated by just enough power consumption by setting the enable signal appropriately.

(Fifth Embodiment)

Figure 13:
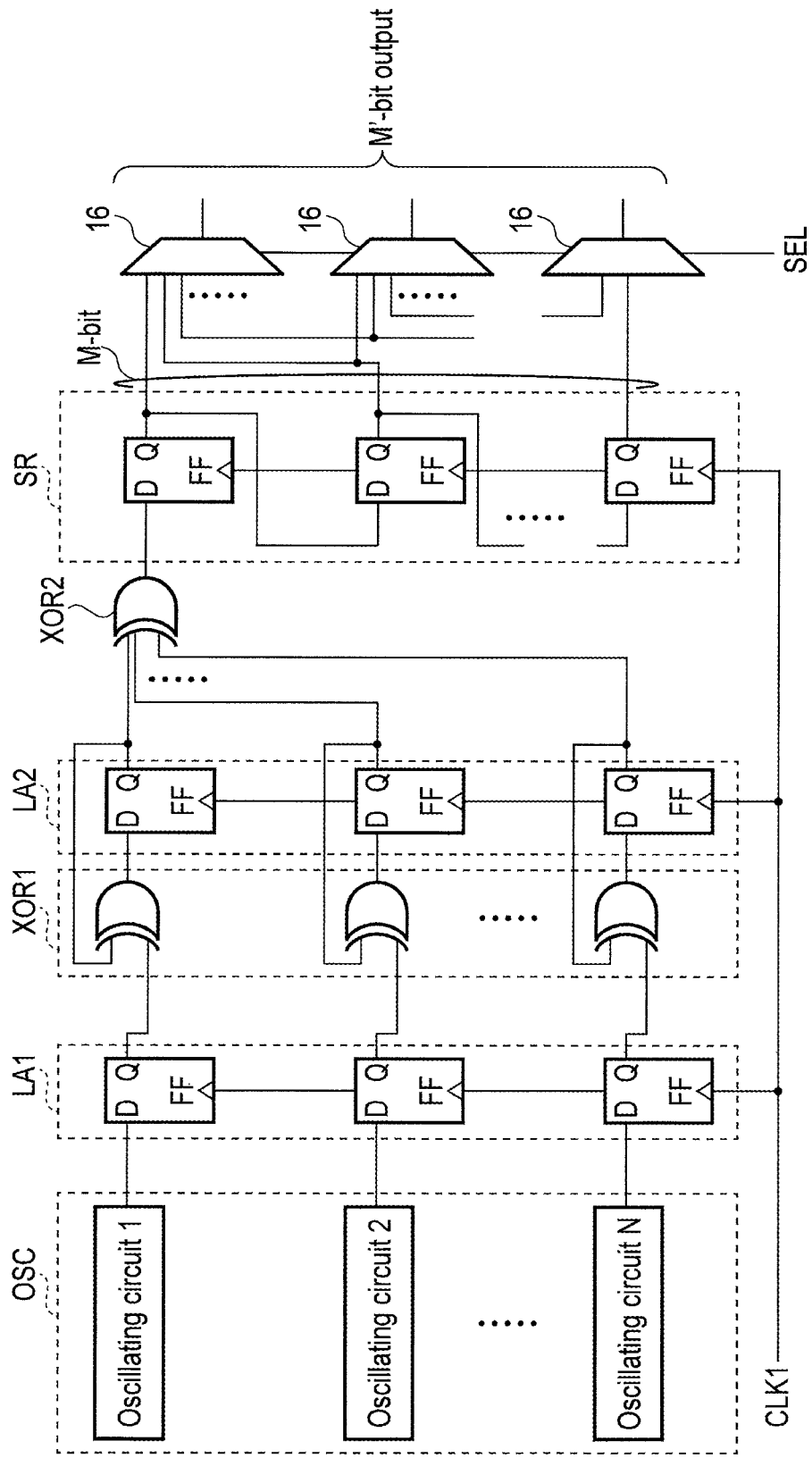
FIG. 13 is a diagram showing a fifth embodiment.

FIG. 13 is a fifth embodiment of the entropy source generating circuit.

In the present example, a first clock CLK1 is used for a shift register SR. That is, N flip-flop circuits FF in the first stage, N flip-flop circuits FF in the second stage, and the shift register SR are all controlled by the same clock (first clock CLK1). In this case, an operation of thinning out data by the second clock like in each of the above embodiments cannot be performed.

Then, instead, M' (M' is a natural number equal to M or smaller) multiplexers 16' capable of selecting one of M bits (M is a natural number equal to 2 or greater) from the M-bit shift register SR by an output selection signal SEL is provided. The M' multiplexers 16 output M' bits.

Accordingly, M' bits output from the M' multiplexers 16 can be considered as random data and used as an entropy source. That is, in the present example, instead of thinning out data by changing the clock, a method of thinning out data when data stored in the shift register SR is output is adopted.

According to the present example, while the number of bits of the shift register SR increases and additional elements such as multiplexers are needed, an entropy source generating circuit can advantageously be controlled by a clock.

(Sixth Embodiment)

FIG. 14 is a sixth embodiment of the entropy source generating circuit.

In the present example, based on outputs of N flip-flop circuits FF in the first stage, entropy generated by the outputs is measured by using an entropy measuring circuit 17. Then, based on the entropy, a clock control circuit 18 generates a second clock CLK2 and provides the second clock CLK2 to a shift register SR.

For the measurement of entropy, for example, outputs of the N flip-flop circuits FF in the first stage are stored in a shift register in the entropy measuring circuit 17, the ratio of "0" or "1" is measured, and the ratio is artificially considered as a probability P to calculate entropy according to Formula (2) and FIG. 18.

However, if the shift register value in the entropy measuring circuit 17 repeatedly takes "0" and "1" periodically, P=0.5 is obtained and no randomness is recognized.

When, for example, each of N oscillating circuits OSC is a continuous oscillating circuit, cases in which outputs of the N flip-flop circuits FF in the first stage are assumed to have no randomness at all are those cases in which outputs of the same value continue, "0"/"1" is alternately repeated for each clock or the like. In such cases, by storing outputs of the N flip-flop circuits FF in the first stage in every, for example, two clocks in the shift register, a state (P=0.5) in which the shift register value periodically repeats between "0" and "1" can be avoided.

When P=0.5 and randomness should no longer be recognized, entropy is measured by setting P=0.

Similarly, when the intermittent oscillating circuit shown in FIG. 7 is used for each of the N oscillating circuits OSC, the N oscillating circuits OSC repeat alternately between the oscillation state and the holding state if the second control signal CNT2 is assumed to be a signal of the same frequency as a first clock CLK1.

Like the continuous oscillating circuit, a state in which "0" and "1" are periodically repeated is possible in the oscillation state and the holding state and thus, when the intermittent oscillating circuit is used, outputs of the N flip-flop circuits FF in the first stage are stored in the shift register in every, for example, four clocks. Accordingly, a state (P=0.5) in which the shift register value periodically repeats between "0" and "1" can be avoided.

High-entropy data can be obtained by measuring entropy by using Formula (2) and FIG. 18 to automatically set the thinning amount of data, that is, a difference between the frequency of the first clock CLK1 and the frequency of the second clock CLK2 according to Formula (4).

(Seventh Embodiment)

FIG. 15 is a seventh embodiment of the entropy source generating circuit.

The present example shows a configuration example in which the order of an exclusive OR circuit that gives self-feedback and an N-input exclusive OR circuit that calculates an exclusive OR of all outputs of N oscillating circuits OSC is interchanged.

For example, an N-input exclusive OR circuit XOR2 calculates an exclusive OR of N flip-flop circuits FF in the first stage. The output of the N-input exclusive OR circuit XOR2 is input into a 2-input exclusive OR circuit XOR3 that gives self-feedback. Further, the output of the 2-input exclusive OR circuit XOR3 is input into a flip-flop circuit FF (latch circuit LA3) in the second stage and the output of the flip-flop circuit FF in the second stage is input into the 2-input exclusive OR circuit XOR3 as feedback.

Because the exclusive OR does not depend on the order of operations as shown above and thus, an effect like the effect in the first embodiment can also be obtained according to the present configuration. By adopting the configuration in the present example, while the operation load is different between the flip-flop circuits FF in each stage (unbalanced), the circuit scale as an entropy source generating circuit can advantageously be made smaller.

In the seventh embodiment, the frequency divider 10 shown in FIGS. 4, 8, and 9, the shift register 13 shown in FIG. 5, and the oscillating circuit OSC shown in FIG. 7 can be adopted.

Also in the seventh embodiment, the third to sixth embodiments (FIGS. 11 to 14) can be adopted.

CONCLUSION

According to the first to seventh embodiments described above, an entropy source generating circuit resistant to manufacturing variation and capable of generating high-entropy random data can be realized even if oscillating circuit performance falls to low entropy.

In addition, the optimum or maximum effect can be achieved by mutually combining the first to seventh embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A random number generating circuit comprising:
   first to N-th oscillating circuits (N is a natural number equal to 2 or greater);

first to N-th latch circuits that latch outputs of the first to N-th oscillating circuits by a first clock having a first frequency;
first to N-th exclusive OR circuits;
(N+1)-th to (2×N)-th latch circuits that latch outputs of the first to N-th exclusive OR circuits by the first clock;
an (N+1)-th exclusive OR circuit that outputs an exclusive OR of outputs of the (N+1)-th to (2×N)-th latch circuits; and
an M-bit shift register that converts serial data output from the (N+1)-th exclusive OR circuit into M-bit parallel data (M is a natural number equal to 2 or greater) by a second clock having a second frequency,
wherein the output of the i-th exclusive OR circuit is the exclusive OR of i-th feedback output of a subsequent circuit of the first to N-th exclusive OR circuits and the output of the i-th latch circuit (i is one of 1 to N),
the second frequency is equal to or lower than the first frequency,
each of the first to N-th oscillating circuits includes a NOR circuit into which a first control signal is input and an exclusive OR circuit into which a second control signal and the output of the NOR circuit are input and which outputs an oscillating signal, and
the oscillating signal is input into the NOR circuit as a feedback signal.

2. The circuit of claim 1,
wherein the i-th feedback output is the output of the (N+i)-th latch circuit (i is a number from 1 to N).

3. The circuit of claim 1,
wherein the i-th feedback output is the output of the (N+i+1)-th latch circuit (i is a number from 1 to N−1) and
the N-th feedback output is the output of the (N+1)-th latch circuit.

4. The circuit of claim 1, further comprising:
a frequency divider that divides the first frequency by X (X is a natural number),
wherein the second clock is output from the frequency divider.

5. The circuit of claim 4,
wherein the frequency divider selectively outputs one of the first clock and a clock obtained by dividing the first clock by X' (X' is a natural number equal to 2 or greater) as the second clock.

6. The circuit of claim 4, further comprising:
first to N-th shift registers that monitor outputs of the first to N-th latch circuits,
wherein the X is determined based on outputs of the first to N-th shift registers.

7. The circuit of claim 1, further comprising:
M multiplexers capable of selecting one of M bits from the M-bit shift register by an output selection signal,
wherein the first and second frequencies are equal and the M bits from the M multiplexers are used as an entropy source.

8. The circuit of claim 1, further comprising:
an entropy measuring circuit that measures entropy based on outputs of the first to N-th latch circuits; and
a clock control circuit that generates the second clock based on the entropy measured by the entropy measuring circuit.

9. The circuit of claim 1,
wherein a value of the N is an odd number.

10. A random number generating circuit comprising:
first to N-th oscillating circuits (N is a natural number equal to 2 or greater);
first to N-th latch circuits that latch outputs of the first to N-th oscillating circuits by a first clock having a first frequency;
a first exclusive OR circuit that outputs an exclusive OR of outputs of the first to N-th latch circuits;
a second exclusive OR circuit;
an (N+1)-th latch circuit that latches the output of the second exclusive OR circuit by the first clock; and
an M-bit shift register that converts serial data output from the (N+1)-th latch circuit into M-bit parallel data (M is a natural number equal to 2 or greater) by a second clock having a second frequency,
wherein the output of the second exclusive OR circuit is the exclusive OR of the output of the first exclusive OR circuit and the output of the (N+1)-th latch circuit,
the second frequency is equal to or lower than the first frequency,
each of the first to N-th oscillating circuits includes a NOR circuit into which a first control signal is input and an exclusive OR circuit into which a second control signal and the output of the NOR circuit are input and which outputs an oscillating signal, and
the oscillating signal is input into the NOR circuit as a feedback signal.

11. The circuit of claim 10, further comprising:
a frequency divider that divides the first frequency by X (X is a natural number),
wherein the second clock is output from the frequency divider.

12. The circuit of claim 11,
wherein the frequency divider selectively outputs one of the first clock and a clock obtained by dividing the first clock by X' (X' is a natural number equal to 2 or greater) as the second clock.

13. The circuit of claim 11, further comprising:
first to N-th shift registers that monitor outputs of the first to N-th latch circuits,
wherein the X is determined based on outputs of the first to N-th shift registers.

14. The circuit of claim 10, further comprising:
M multiplexers capable of selecting one of M bits from the M-bit shift register by an output selection signal,
wherein the first and second frequencies are equal and the M bits from the M multiplexers are used as an entropy source.

15. The circuit of claim 10, further comprising:
an entropy measuring circuit that measures entropy based on outputs of the first to N-th latch circuits; and
a clock control circuit that generates the second clock based on the entropy measured by the entropy measuring circuit.

16. The circuit of claim 10,
wherein a value of the N is an odd number.

17. A random number generating circuit comprising:
first to N-th oscillating circuits (N is a natural number equal to 2 or greater);
first to N-th latch circuits that latch outputs of the first to N-th oscillating circuits by a first clock having a first frequency;
first to N-th exclusive OR circuits;
(N+1)-th to (2×N)-th latch circuits that latch outputs of the first to N-th exclusive OR circuits by the first clock;
an (N+1)-th exclusive OR circuit that outputs an exclusive OR of outputs of the (N+1)-th to (2×N)-th latch circuits;
an M-bit shift register that converts serial data output from the (N+1)-th exclusive OR circuit into M-bit parallel data (M is a natural number equal to 2 or greater) by a second clock having a second frequency; and a frequency divider that divides the first frequency by X (X is a natural number), wherein the output of the i-th exclusive OR circuit is the exclusive OR of i-th feedback output of a subsequent circuit of the first to N-th exclusive OR circuits and the output of the i-th latch circuit (i is a number from 1 to N), the second frequency is equal to or lower than the first frequency, the i-th feedback output is the output of the (N+i)-th latch circuit (i is a number from 1 to N), each of the first to N-th oscillating circuits includes a NOR circuit into which a first control signal is input and an exclusive OR circuit into which a second control signal and the output of the NOR circuit are input and which outputs an oscillating signal, and the oscillating signal is input into the NOR circuit as a feedback signal.

* * * * *